(12) United States Patent
Zhou et al.

(10) Patent No.: US 9,531,844 B2
(45) Date of Patent: Dec. 27, 2016

(54) AUTOMATIC INTERNET CONNECTION SHARING AMONG RELATED DEVICES

(75) Inventors: Yi Zhou, San Diego, CA (US); Kirk Dulaney, Escondido, CA (US); Hong Ye, Fremont, CA (US); Adrian Crisan, San Diego, CA (US)

(73) Assignee: Sony Corporation, Tokyo (JP)

(*) Notice: Subject to any disclaimer, the term of this patent is extended or adjusted under 35 U.S.C. 154(b) by 1408 days.

(21) Appl. No.: 12/571,638

(22) Filed: Oct. 1, 2009

(65) Prior Publication Data

US 2011/0082933 A1  Apr. 7, 2011

(51) Int. Cl.
*G06F 15/16* (2006.01)
*H04L 29/06* (2006.01)

(52) U.S. Cl.
CPC ............. *H04L 69/08* (2013.01); *H04L 69/18* (2013.01)

(58) Field of Classification Search
CPC ................................. H04L 69/08; H04L 69/18
USPC .................................. 709/225; 370/328, 338
See application file for complete search history.

(56) References Cited

U.S. PATENT DOCUMENTS

| | | | | |
|---|---|---|---|---|
| 6,449,052 B1* | 9/2002 | Sherer et al. | ............... | 358/1.13 |
| 6,452,910 B1* | 9/2002 | Vij et al. | ...................... | 370/310 |
| 6,680,923 B1* | 1/2004 | Leon | ............................ | 370/328 |
| 7,034,871 B2* | 4/2006 | Parulski et al. | ........... | 348/231.3 |
| 7,525,680 B2* | 4/2009 | Berarducci et al. | ........ | 358/1.15 |
| 7,747,219 B2* | 6/2010 | Shiohara et al. | ............ | 455/41.2 |
| 7,747,279 B2* | 6/2010 | Hoddie | ........................ | 455/557 |
| 8,228,861 B1* | 7/2012 | Nix | ................................ | 370/329 |
| 8,996,698 B1* | 3/2015 | Tagg | .............................. | 709/226 |
| 9,177,012 B2* | 11/2015 | Linkola | ............... | H04M 7/0084 |
| 9,225,718 B2* | 12/2015 | Jain | ................... | G06K 19/07739 |
| 2002/0016841 A1* | 2/2002 | Hirashima et al. | ........... | 709/225 |
| 2003/0097473 A1* | 5/2003 | Saitoh | .......................... | 709/245 |
| 2004/0077374 A1* | 4/2004 | Terry | ......................... | 455/552.1 |
| 2004/0114176 A1* | 6/2004 | Bodin et al. | .................. | 358/1.15 |
| 2005/0147073 A1* | 7/2005 | Hietalahti et al. | ........... | 370/338 |
| 2005/0174962 A1* | 8/2005 | Gurevich | ..................... | 370/328 |
| 2005/0259611 A1* | 11/2005 | Bhagwat et al. | ............ | 370/328 |
| 2006/0013197 A1* | 1/2006 | Anderson | ..................... | 370/352 |
| 2007/0025334 A1* | 2/2007 | Meyer | .......................... | 370/352 |
| 2007/0033197 A1* | 2/2007 | Scherzer et al. | ................ | 707/10 |
| 2007/0104169 A1 | 5/2007 | Polson | | |
| 2007/0168553 A1 | 7/2007 | Jones et al. | | |
| 2007/0189247 A1* | 8/2007 | Wang et al. | ................... | 370/338 |
| 2008/0096504 A1* | 4/2008 | Linkola et al. | ............. | 455/187.1 |
| 2008/0198823 A1* | 8/2008 | Shiu et al. | ..................... | 370/338 |
| 2008/0231716 A1* | 9/2008 | Anderson | .................. | 348/211.3 |
| 2009/0209268 A1* | 8/2009 | Ha et al. | .................... | 455/456.1 |
| 2009/0287798 A1* | 11/2009 | Law et al. | ..................... | 709/220 |

(Continued)

OTHER PUBLICATIONS

Bigioi, Petronel et al., "Connectivity Solution to Link a Bluetooth Camera to the Internet" IEEE Transactions on Consumer Electronics, vol. 47, No. 3, Aug. 2001.*

(Continued)

*Primary Examiner* — Douglas Blair
(74) *Attorney, Agent, or Firm* — Chip Law Group

(57) ABSTRACT

Internet connection may come through a single host computer and sent to appliance computers, as in a laptop or camera. This application intends to automatically connect the appliances to the Internet established by the host computer by means of either electronic communication or pre-programming both computers with the same network access information.

11 Claims, 3 Drawing Sheets

(56) References Cited

U.S. PATENT DOCUMENTS

| | | | |
|---|---|---|---|
| 2010/0066839 A1* | 3/2010 | Azuma et al. | 348/207.1 |
| 2010/0079599 A1* | 4/2010 | Kanma | 348/207.1 |
| 2010/0093375 A1* | 4/2010 | Buckley et al. | 455/456.3 |
| 2010/0124213 A1* | 5/2010 | Ise et al. | 370/338 |
| 2010/0157067 A1* | 6/2010 | Karn et al. | 348/207.1 |
| 2010/0277597 A1* | 11/2010 | Vaysburg et al. | 348/207.1 |
| 2010/0292556 A1* | 11/2010 | Golden | 600/364 |
| 2010/0296441 A1* | 11/2010 | Barkan | 370/328 |
| 2011/0032914 A1* | 2/2011 | Venkateswaran et al. | 370/338 |
| 2011/0128389 A1* | 6/2011 | Maeda et al. | 348/207.1 |
| 2011/0193973 A1* | 8/2011 | Motoki et al. | 348/207.1 |
| 2011/0255525 A1* | 10/2011 | Powell et al. | 370/338 |
| 2011/0299686 A1* | 12/2011 | Saboff et al. | 380/274 |
| 2012/0057033 A1* | 3/2012 | Morino | 348/207.1 |
| 2012/0127980 A1* | 5/2012 | Quinn | 370/338 |
| 2013/0058274 A1* | 3/2013 | Scherzer et al. | 370/328 |

OTHER PUBLICATIONS

Synchrotech, "Wireless Gateway/ Routers for WWAN 3G/4G to WiFi/Ethernet Networks", http://www.synchrotech.com/product-misc/wireless_router_gateway_wwan_wlan_00.html, 2009.

Kent German, "Carry your Wi-Fi with the Verizon Mifi", http://news.cnet.com/8301-17938_105-10235202-1.html, Sep. 24, 2009.

* cited by examiner

AUTOMATIC INTERNET CONNECTION SHARING AMONG RELATED DEVICES

FIELD OF THE INVENTION

The present invention relates to automatically sharing an Internet connection of one device with other related devices.

BACKGROUND OF THE INVENTION

Many end users have multiple computing devices each of which may need to communicate with the Internet but only one of which may have Internet access. For example, a camera may have the capacity for Internet connection but cannot do so without the use of an intermediate connection, such as a PC. Pictures may be directly uploaded to Internet storage, sent via email, or otherwise shared via the Internet. A laptop similarly may connect to the Internet via a PC. Internet connections via an intermediate device must be manually set up and established by both the intermediate and end devices. As understood herein, this connecting step among related devices may be omitted if all devices could use this interface without requiring the end user to input network access information.

SUMMARY OF THE INVENTION

Accordingly, a system includes a host computer including a host processor and a wide area network (WAN) interface communicating with the Internet. The WAN interface establishes a virtual access point (AP) to the Internet. At least one appliance computer is configured for wirelessly communicating with the host computer using a local area network (LAN) interface. The appliance computer includes an appliance processor, and the host processor and appliance processor cooperate by automatically exchanging network access information through the LAN interface to cause the appliance computer automatically to access the Internet through the virtual AP without requiring an end user of the appliance computer to enter a computer address or a computer identification.

The appliance computer may be, without limitation, a laptop computer or a digital camera or a personal digital assistant or a mobile telephone. The host computer may be, e.g., a personal computer (PC) or a laptop computer. The WAN interface can be a Wimax or long term evolution (LTE) interface whereas the LAN interface can be a WiFi or Bluetooth interface.

In one embodiment the network access information is a media access control (MAC) address of the appliance computer that the appliance computer automatically sends to the host computer upon initially communicating with the host computer through the LAN interface. The host computer subsequently and without user interaction, upon establishing communication with the Internet through the WAN interface, automatically sends an invitation to the appliance computer through the LAN interface to communicate with the Internet using the WAN interface of the host computer.

In another embodiment the network access information is a service set identifier (SSID) of the virtual AP. The SSID is provided to the appliance computer prior to vending the appliance computer to an end user. The appliance computer is programmed to automatically connect to the SSID upon establishing communication between the appliance computer and the host computer after vending the appliance computer to an end user.

In another aspect, a method includes predefining a service set identifier (SSID) of a virtual AP established by a wide area network (WAN) interface of a host computer and preprogramming the SSID into at least one appliance computer to be vended to an end user of the host computer. The method also includes causing the appliance computer, upon initial communication with the host computer after vending to the end user, to automatically establish communication with the Internet through the WAN interface of the host computer without end user interaction.

In another aspect, a method includes, upon initial communication through a local area network (LAN) interface between a host computer and an appliance computer associated with an end user, automatically sending a media access control (MAC) address of the appliance computer to the host computer. Upon the establishment of communication between the host computer and the Internet, the host computer is caused to automatically without user interaction invite the appliance computer to establish Internet connectivity with the Internet through the host computer.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
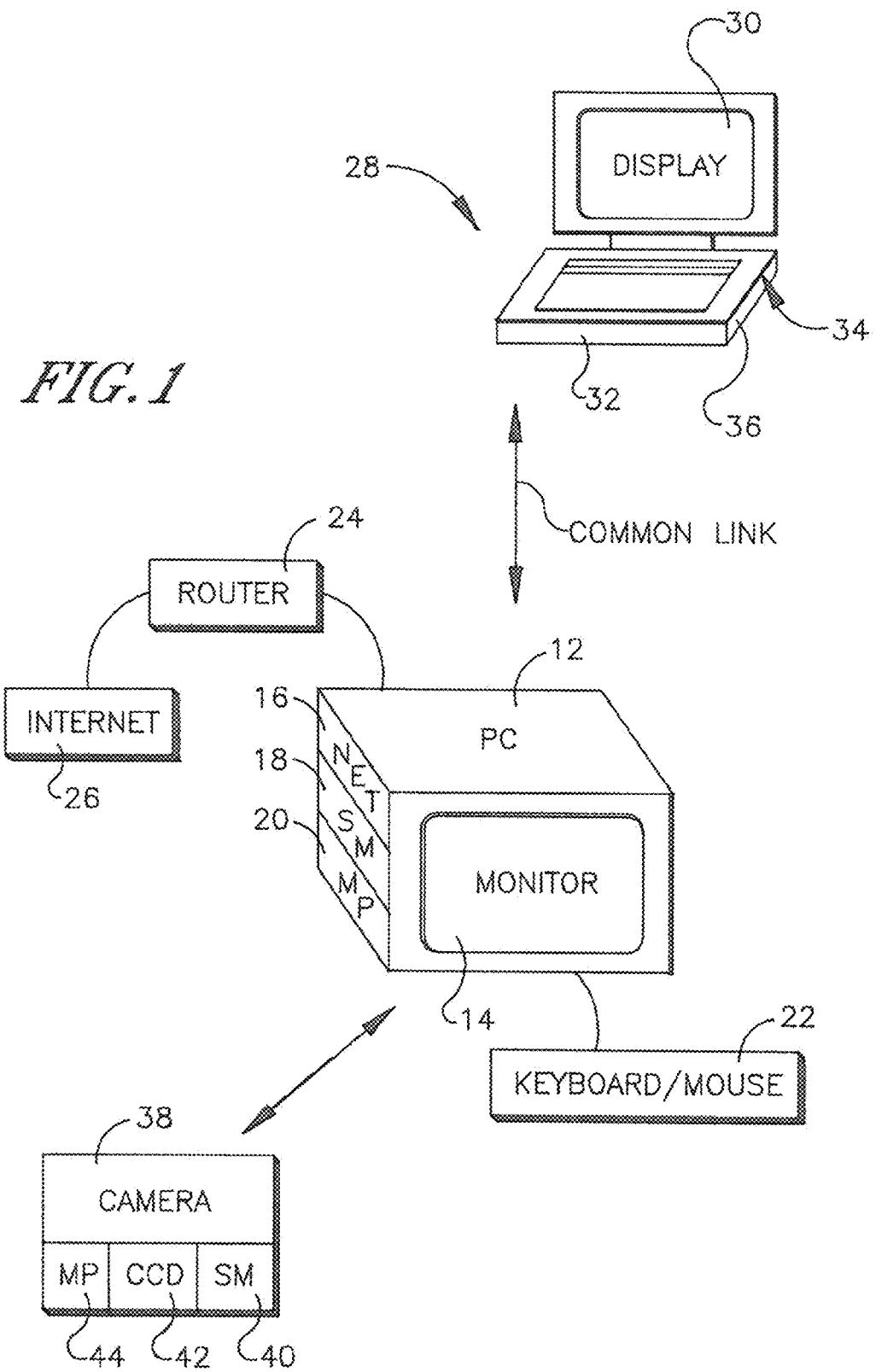
FIG. 1 is a block diagram of an example system in accordance with present principles.

Referring initially to FIG. 1, a system generally labeled 10 includes a host computer 12 with a display 14, wide area network interface (I/F) 16, storage medium 18 and host microprocessor 20. The PC 12 may also have a keyboard or mouse 22 wired for communication and information transfer. The PC 12 is connected, in some cases wirelessly, to a router 24, which is in turn connected to and communicates with the Internet 26.

The system 10 also includes at least one appliance computer 28 configured for wirelessly communicating with the host computer 12 using a local area network (LAN) interface. The LAN interface may be, but is not limited to, WiFi or Bluetooth interface. The appliance computer 28 includes a display 30, network IN 32, storage medium 34, and processor 36. The appliance computer 28 may be a laptop computer. The host processor 20 and appliance processor 36 cooperate by automatically exchanging network access information through the LAN interface to cause the appliance computer 28 automatically to access the Internet 26 through the virtual AP without requiring an end user of the appliance computer 28 to enter a computer address or a computer identification. Alternatively, the appliance computer may be embodied in a digital camera 38, which also contains a storage medium 40, charge coupled device (CCD) 42, and microprocessor 44.

Figure 2:
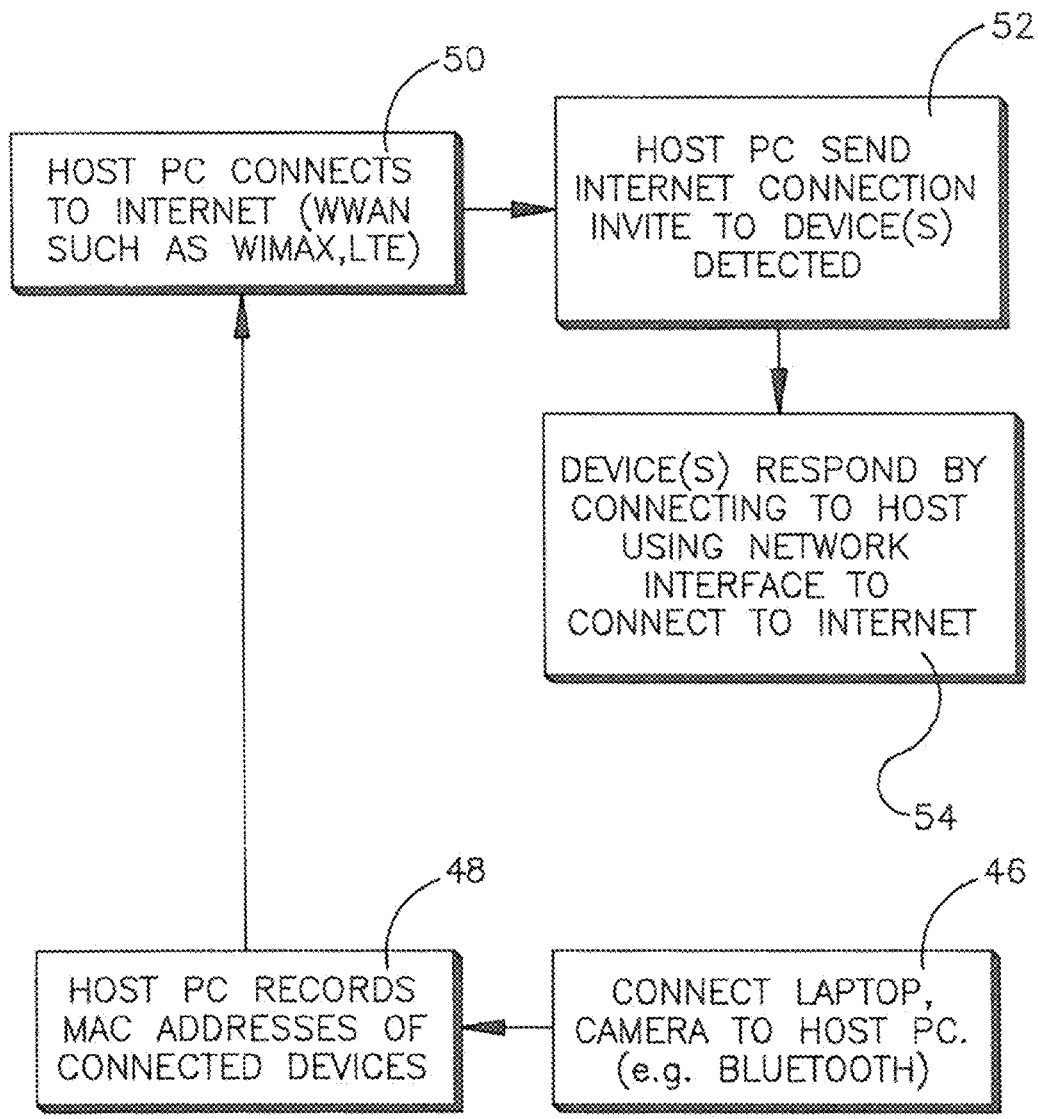
FIG. 2 is a flow chart of a first embodiment of example logic for sharing a host computer Internet interface among multiple end user devices.

Moving in reference to FIG. 2, a logic flow chart describes one embodiment of sharing a host computer Internet interface among multiple end user devices. In block 46, Bluetooth or any other wired or wireless communication means connects the appliance computer 28 or camera 38 to the host PC 12, which then automatically records the network access information of the connected devices, as in block 48. The network access information could be a media access control (MAC) address of the appliance computer 28 that the appliance computer automatically sends to the host computer upon initially communicating with the host computer through the LAN interface. Once the addresses are recorded, the host PC 12 establishes connection with the Internet (or other wide area network) using a wide area network link such as WIMAX or long-term evolution (LTE) as directed by block 50.

For each of subsequent connections of the host computer with the Internet and as indicated at block 52, the host PC 12 automatically invites via LAN connection the appliance devices, in this case the laptop computer 28 and camera 38 to the established Internet connection. The MAC addresses of the appliance computers may be used for this automatic invitation, specifically to direct the automatic invitation to specific pre-recorded network addresses. The appliance devices then respond automatically by connecting to the host PC 12 by means of a network interface in order to establish Internet connection, as in block 54. The appliance devices automatically connect to the Internet using the WAN interface of the host PC 12. Because all of the logic in FIG. 2 occurs without user intervention, the user of devices such as cameras, laptops, etc. that are related to the host computer by means of common ownership is relieved of the cumbersome chore of inputting network connection signals to the appliance computers.

Figure 3:
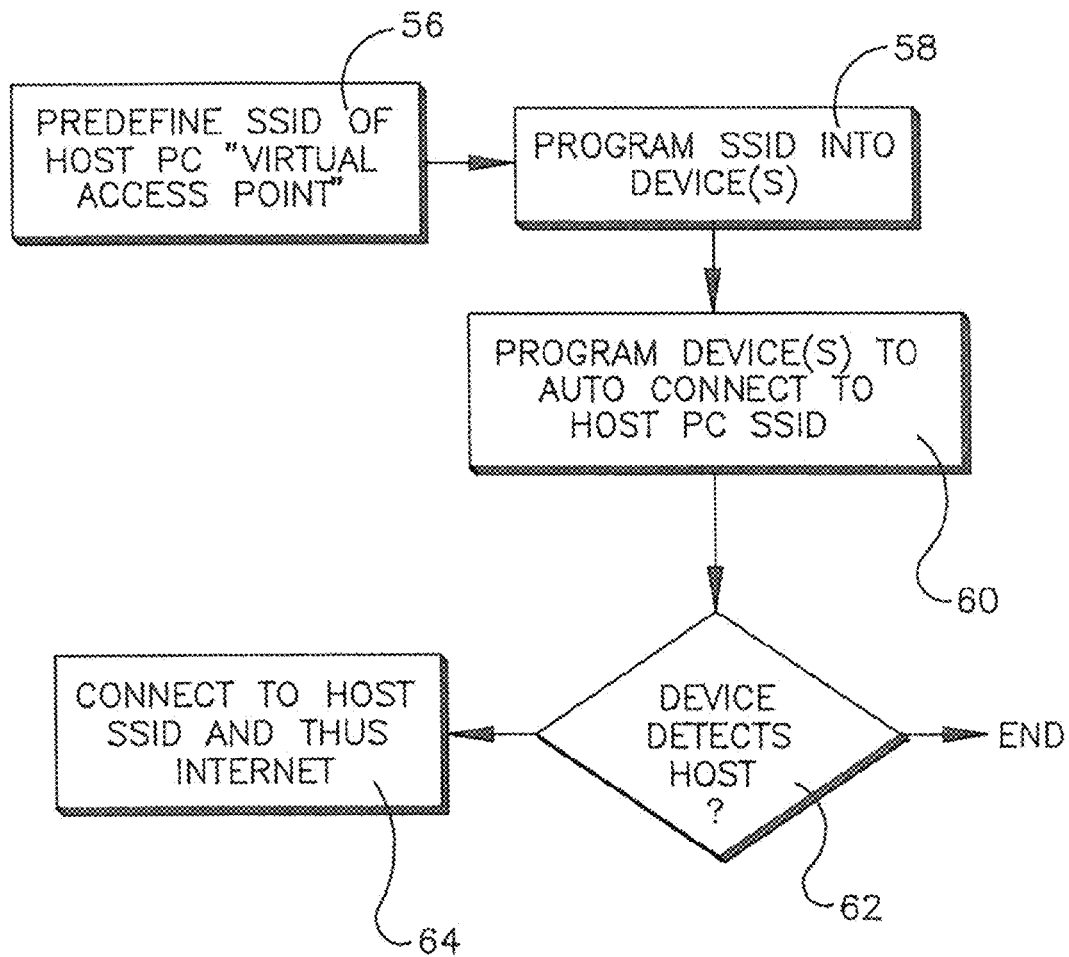
FIG. 3 is a flow chart of a second embodiment of example logic for sharing a host computer Internet interface among multiple end user devices.

Now referring to FIG. 3 for alternate automatic connection sharing logic, the network access information may be in the form of a service set identifier (SSID) of the virtual AP, the SSID being provided to the appliance computer 28 prior to vending the appliance computer 28 to an end user. In block 56, the SSID of the host PC 12 is predefined and acts as a virtual access point. The SSID is also programmed into the devices, as in block 58. The appliance computer is programmed to automatically connect to the SSID, as in block 60, upon establishing communication between the appliance computer 28 and the host computer 12 after vending the appliance computer 28 to an end user. In diamond box 62, the appliance determines whether it can detect the host over, e.g., a local area, network. If the appliance computer 28 is not connected to the host computer, then the process ends and no Internet connection is made. Alternatively, if the appliance computer 28 detects the host computer a connection with the SSID of the virtual access point is automatically made by the appliance computer. The appliance computer can thus connect to the Internet, shown in block 64, without user interaction.

While the particular AUTOMATIC INTERNET CONNECTION SHARING AMONG RELATED DEVICES is herein shown and described in detail, it is to be understood that the subject matter which is encompassed by the present invention is limited only by the claims.

What is claimed is:

1. A system comprising:
    a host computer comprising a host processor and a wide area network (WAN) interface communicating with the Internet, the WAN interface establishing a virtual access point (AP) to the Internet; and
    at least one appliance computer operable to wirelessly communicate with the host computer using a local area network (LAN) interface, the at least one appliance computer comprising an appliance processor,
    wherein the host processor and the appliance processor cooperate by exchanging network access information through the LAN interface to cause the at least one appliance computer to access the Internet through the virtual AP without requiring an end user of the at least one appliance computer to enter a computer address or a computer identification,
    wherein the at least one appliance computer associated with the end user sends a media access control (MAC) address of the at least one appliance computer to the host computer,
    wherein the host computer sends an invitation, directed to the at least one appliance computer, using the MAC address of the at least one appliance computer through the LAN interface to communicate with the Internet using the WAN interface of the host computer, and wherein, in response to the invitation, the at least one appliance computer connects to the Internet through the WAN interface of the host computer.

2. The system of claim 1, wherein the at least one appliance computer is a laptop computer.

3. The system of claim 1, wherein the at least one appliance computer is embodied in a digital camera.

4. The system of claim 1, wherein the WAN interface is a Wimax or long term evolution (LTE) interface.

5. The system of claim 1, wherein the LAN interface is a WiFi or Bluetooth interface.

6. A method comprising:
    in a host computer:
        receiving a media access control (MAC) address of an appliance computer associated with an end user based on an initial communication between the host computer and the appliance computer through a local area network (LAN) interface; and
        sending an invitation, directed to the appliance computer, using the MAC address of the appliance computer to establish Internet connectivity with the Internet through the host computer based on establishment of communication between the host computer and the Internet,
    wherein the appliance computer is configured to connect to the host computer to access the Internet through the WAN interface and automatically upload data from the appliance computer to the Internet without user interaction in response to the invitation.

7. The method of claim 6, wherein the appliance computer is a laptop computer.

8. The method of claim 6, wherein the appliance computer is embodied in a digital camera.

9. The method of claim 6, wherein Internet connectivity is established between the host computer and the Internet using a wide area network (WAN) interface.

10. The method of claim 9, wherein the WAN interface is a Wimax or long term evolution (LTE) interface.

11. The method of claim 6, wherein the LAN interface is a WiFi or Bluetooth interface.

* * * * *

UNITED STATES PATENT AND TRADEMARK OFFICE
CERTIFICATE OF CORRECTION

| | |
|---|---|
| PATENT NO. | : 9,531,844 B2 |
| APPLICATION NO. | : 12/571638 |
| DATED | : December 27, 2016 |
| INVENTOR(S) | : Yi Zhou et al. |

It is certified that error appears in the above-identified patent and that said Letters Patent is hereby corrected as shown below:

On the Title Page

Under Item (73), "Assignee: Sony Corporation, Tokyo (JP)" should be -- Assignee: Sony Corporation, Tokyo (JP); Sony Electronics Inc., Park Ridge, NJ --

Signed and Sealed this
Tenth Day of July, 2018

Andrei Iancu
*Director of the United States Patent and Trademark Office*